Patented July 13, 1926.

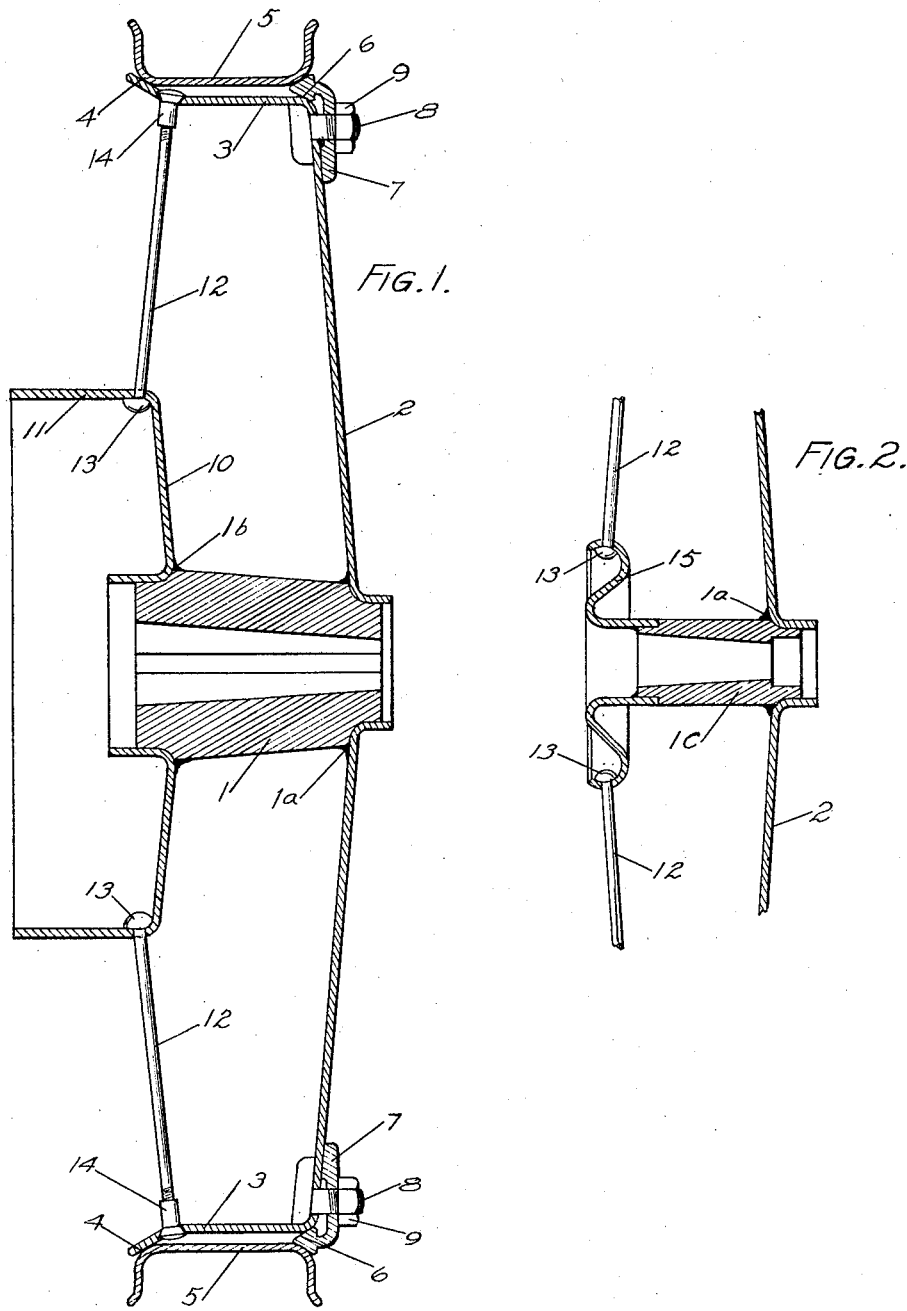

1,592,319

UNITED STATES PATENT OFFICE.

LEWIS E. YOUNIE, OF PORTLAND, OREGON.

WHEEL.

Application filed April 1, 1925. Serial No. 19,803.

The invention is designed to improve wheels such as are used on automobiles. Wheels known as disc wheels have very marked advantages in some respects. Other wheels are of the suspension type using wire spokes and these have very marked advantages in some respects but have very marked disadvantages in other respects, particularly as to being adapted to carry a demountable rim. The present invention is designed to unite the advantageous features of both types of wheel in one wheel. Other features and details of the invention will appear from the specification and claims.

The invention is illustrated in the accompanying drawings as follows:—

Fig. 1 shows a central vertical section through a wheel.

Fig. 2 a similar view of a part of a wheel showing a variation in the hub construction.

1 marks the hub, and 2 a disc which is secured to the front face of the hub preferably by flanging and electric welding as at 1ª. The outer edge of the disc is flanged at 3 forming a fixed rim for the wheel and this has a tapered surface 4 for receiving the demountable rim 5 which may be of any of the desired types of demountable rim. The rim is clamped in place by the clamping segment 6 having ears 7 extending along the face of the disc 2. Bolts 8 extend from the inside of the disc through the ears 7 and nuts 9 are arranged on the bolts by means of which the clamping segments can be forced between the edge of the fixed rim and the demountable rim forcing the demountable rim into place and clamping the same securely.

At the inner end of the hub a spoke shell 10 is secured preferably by welding 1ᵇ. In the rear wheel, or where a brake is used the brake drum 11 extends from this shell. Spokes 12 extend through the shell having heads 13 and are secured to the inner edge of the rim by nipples 14 which are secured through the rim to the spokes. The spokes may be tensioned in the usual manner by adjusting the nipples, and the spokes act in the manner of a suspension wheel. Thus a very light and very strong wheel is provided with all the advantages of a disc wheel and many of the advantages of the spoke wheel.

In the construction shown in Fig. 2 there is the ordinary front wheel in which the hub 1ᶜ is provided with the disc 2 similar to the disc 2 in Fig. 1 and a spoke shell 15 which is only of sufficient circumference to form a securing means for the spokes 12.

What I claim as new is:—

1. In a wheel, the combination of a metal disc; a fixed rim extending from the disc; a hub on which the disc is mounted; and wire spokes extending from the hub and coacting with the disc in supporting the rim.

2. In a wheel, the combination of a metal disc; a fixed rim extending laterally from one side of the disc; a hub on which the disc is mounted; and wire spokes extending from the hub to the rim at points remote from the disc.

3. In a wheel, the combination of a metal disc; a fixed rim flanged on the disc; a hub on which the disc is mounted; and spokes extending from the hub to the rim.

4. In a wheel, the combination of a metal disc; a fixed rim extending from the disc; a hub on which the disc is mounted; a spoke shell secured to the hub; and spokes extending from the shell and coacting with the disc in supporting the rim.

5. In a wheel, the combination of a metal disc; a fixed rim extending from the disc; a hub on which the disc is mounted; a spoke shell in the form of a brake drum secured to the hub; and spokes extending from the shell and coacting with the disc in supporting the rim.

In testimony whereof I have hereunto set my hand.

LEWIS E. YOUNIE.